(No Model.)
H. M. POWELL.
VEHICLE AXLE.
No. 554,536. Patented Feb. 11, 1896.
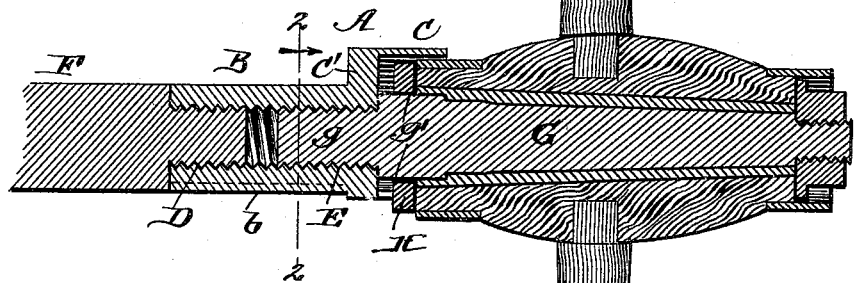
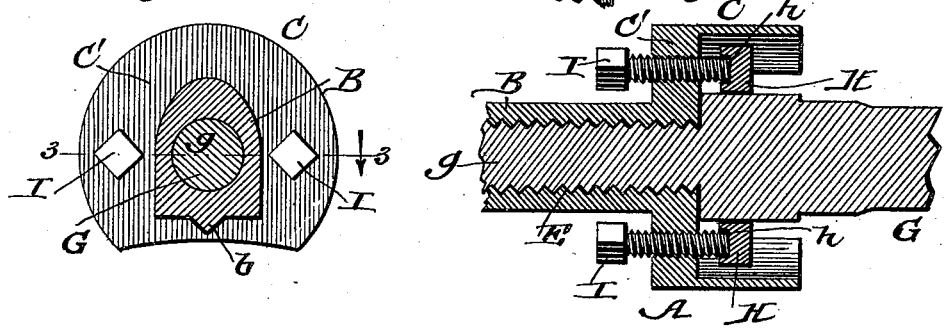
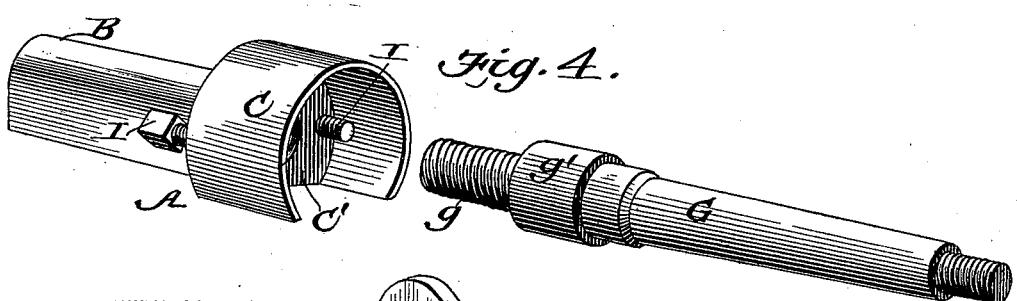
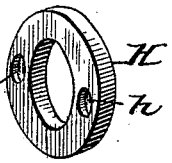
WITNESSES:
INVENTOR
Henry M. Powell.
BY
ATTORNEYS.

UNITED STATES PATENT OFFICE.

HENRY MADISON POWELL, OF FLORENCE, GEORGIA.

VEHICLE-AXLE.

SPECIFICATION forming part of Letters Patent No. 554,536, dated February 11, 1896.

Application filed October 1, 1895. Serial No. 564,280. (No model.)

*To all whom it may concern:*

Be it known that I, HENRY MADISON POWELL, of Florence, in the county of Stewart and State of Georgia, have invented a new and useful Improvement in Axles, of which the following is a specification.

My invention is an improvement in axles for buggies and other vehicles, and has for its objects, among others, to provide an improved construction of the sand-box, a novel construction for taking up the lost motion and wear of the hub upon the spindle and general improvements in the spindle and sand-box; and the invention consists in certain novel constructions, combinations, and arrangements of parts, as will be hereinafter described, and pointed out in the claims.

In the drawings, Figure 1 is a longitudinal section of my improved axle, partly broken away. Fig. 2 is a cross-section on about line 2 2 of Fig. 1. Fig. 3 is a detail section on about line 3 3 of Fig. 2, and Fig. 4 is a detail perspective view showing the parts detached.

In carrying out my invention I provide a sand-box A composed of a body B and a shell or band C at the outer end of said body. This shell forms a hood which fits over the inner end of the hub and prevents sand from sifting down onto the inner end of the spindle and thence between the same and the box of the hub. At its bottom the shell is open, so that sand, grit, or other dirt that may by any means get therein can readily escape.

On the under side of the body B, I provide a longitudinal rib $b$, and in the inner and outer ends of said body I form threaded sockets D and E, the inner socket, D, receiving the threaded end of the axle F and the outer socket, E, the threaded end of the spindle G.

The axle may be made especially for the improved devices, or they can be fitted to the ordinary axle in use by cutting off the spindle of such axle and threading the end of such axle to fit in the socket D. This makes the invention universal in its application, as it simply requires ordinary cutting and threading devices to enable its immediate application to any ordinary vehicle.

The spindle G has at its inner end a threaded tenon $g$ to fit in the socket E, and has immediately next said tenon an enlarged portion $g'$ on which the collar H fits and along which it may be set longitudinally by the set-screws I turning through the back plate C' of the shell C. These screws I, preferably one at each side of the spindle, have their points fitted in sockets $h$ in the washer so that the latter is held from turning and may be fed up evenly to take up lost motion in the wheel and secure a proper fit without requiring the duplication of the outer washer. By means of the pins I and sockets $h$ if the washer wears more at one part than another it may be given a half-revolution and again secured, thus bringing a new surface to the point of greatest wear. It is evident that by my improvement the wheel-hub will be protected against damage by sand, can be quickly tightened up, and that the improvements can be readily applied to the ordinary axle in the manner specifically described above.

An important result of my improvement is that when a wheel or spindle, or both, becomes badly worn I can remove the spindle and replace it by a larger spindle.

By the improvement the wheels may be kept accurately in track, making the draft much easier.

Having thus described my invention, what I claim as new, and desire to secure by Letters Patent, is—

1. The combination of the sand-box, the spindle, the washer and the set-screws turned through the sand-box and arranged to operate the washer substantially as set forth.

2. The combination of the sand-box, the spindle, the washer provided with the sockets, and the set-screws turned through the sand-box and fitting at their points in the sockets of the washer substantially as set forth.

3. A sand-box having a portion adapted to fit over the end of the hub and provided with portions for connection with the body of the axle and for detachable connection with the spindle combined with the spindle substantially as set forth.

4. A sand-box composed of a body having in its outer and inner ends threaded sockets and provided at its outer end with an overhanging shell forming a sand-band to fit over the inner end of the wheel-hub substantially as set forth.

5. The improvement in axles herein described consisting of the sand-box having a body provided in its inner end with a socket for the axle-body and in its outer end with a socket for the spindle, and provided at its outer end with an overhanging hood-like shell or sand-band open at the bottom, the spindle threaded at its inner end in the outer socket of the sand-box body, the washer fitting and sliding on the spindle and provided in its rear side with sockets, and the set-screws turned through the back plate of the sand-box and having their points fitting in the sockets of the washer all substantially as and for the purposes set forth.

HENRY MADISON POWELL.

Witnesses:
JOHN W. TURNER,
BENJAMON L. McKLERG.